2,938,052

RECOVERY OF TETRACYCLINE

Takeshi Yamada, Tokyo, Japan, assignor to American Cyanamid Company, New York, N.Y., a corporation of Maine No Drawing. Filed Jan. 4, 1957, Ser. No. 632,420

Claims priority, application Japan Mar. 10, 1956

1 Claim. (Cl. 260—559)

This invention relates to the recovery of tetracycline and more particularly is concerned with a novel method of recovering tetracycline from chlortetracycline reduction solution mother liquors.

Tetracycline may be prepared by the reductive dechlorination of chlortetracycline. Conventionally, this process may be carried out by reducing a solution of chlortetracycline with hydrogen in the presence of metallic palladium or platinum on a charcoal catalyst. The reduction reaction is usually carried out in an organic solvent for the chlortetracycline such as the lower aliphatic alcohols, glycol ethers and the like. Solvents such as 2-ethoxyethanol, 2-methoxyethanol, n-butanol, methanol, ethanol and mixtures thereof have been used. The reaction may be carried out at temperatures of from 0 to 100° C. and at hydrogen pressures on the order of 15–60 lbs. per square inch absolute. Usually an acid acceptor such as triethylamine or other organic base is present in the reaction mixture in a quantity sufficient to combine with all of the hydrochloric acid liberated by the hydrogenolysis reaction so that the tetracycline is produced and recovered as the free base. The catalyst is filtered off. The filtrate containing the activity is acidified, seeded and aged and tetracycline hydrochloride is crystallized therefrom. The crystals are then filtered, washed and vacuum dried. A hydrogenolysis procedure, such as just been described, is more particularly described in J.A.C.S. 75, 4621 (1953).

A considerable amount of tetracycline hydrochloride or tetracycline free base remains dissolved in the reduction solution mother liquor, frequently as much as 10–15% or more and is normally discarded along with the mother liquor since the salvaging of this material in pure form from the mother liquor has heretofore been exceedingly difficult.

In accordance with the present invention, it has been discovered that it is possible to precipitate the tetracycline from the mother liquor as an alkaline earth metal salt in a manner so as not only to salvage a greater part of the tetracycline which was heretofore discarded, but also to obtain good yields of rather pure material. It has been observed that when an alkaline earth metal salt, such as calcium hydroxide, barium hydroxide, etc., for example, is added directly to the chlortetracycline reduction solution, calcium tetracycline begins to precipitate almost immediately. However, this precipitate is so impure that considerable difficulty is involved in purifying it so as to recover the tetracycline. Therefore, in accordance with the present invention, it is desirable first to dilute the mother liquor with water and to raise the pH, which normally is around 1.5–1.7, up to about 2.5–3.3 by the addition of a dilute aqueous solution of an alkali such as sodium hydroxide, sodium carbonate or ammonia. An aqueous solution of 3.5% NaOH is such a useful alkaline solution, for example.

At this pH, 2.5–3.3, the tetracycline is isolated from most of the impurities present in the mother liquor and yet at this pH the tetracycline will not form a sodium salt. When an alkaline earth metal salt, for example, calcium hydroxide, is then added and the pH raised to about 4.0–4.5, the tetracycline combines with the calcium to form calcium tetracycline. At this pH relatively pure calcium tetracycline crystallizes and is precipitated upon cooling. The calcium tetracycline is filtered off, washed with a lower alkanol and dried.

The alkaline earth metal salt of tetracycline may be used as such if desired or it may be converted into tetracycline hydrochloride. This may conveniently be accomplished by slurrying the alkaline earth metal salt of tetracycline in a lower alkoxy lower alkanol, i.e. 2-methoxyethanol, or 2-ethoxyethanol, or a lower alkanol, i.e. methanol, ethanol, n-butanol, etc., adding a nitrogenous base such as triethylamine, ammonia, ethanolamine, morpholine, etc., so as to bring about solution of the tetracycline salt, separating any insoluble impurities, and precipitating tetracycline as a mineral acid salt by adding a mineral acid such as hydrochloric acid, sulfuric acid, etc., to the solution. The thus formed mineral acid salt of tetracycline is recovered by filtration, is washed with a lower alkanol, i.e., isopropanol and dried.

The invention will be described in greater detail in conjunction with the following specific examples.

Example 1

Five grams of chlortetracycline hydrochloride are slurried with 10.0 milliliters of butanol, 10.0 milliliters of 2-ethoxyethanol and 0.7 milliliter of water. To this slurry is added 3.4 milliliters of triethylamine and 0.7 gram of 5% palladium on carbon. The reduction is carried out on a Parr shaker.

| Time, minutes: | Hydrogen uptake, p.s.i. |
|---|---|
| 0 | 40.0 |
| 0.5 | 38.0 |
| 1.0 | 37.0 |
| 2.0 | 35.0 |
| 3.0 | 33.0 |
| 5.0 | 31.0 |
| 10.0 | 27.0 |
| 15.0 | 26.0 |
| 20.0 | 25.5 |
| 30.0 | 25.5 |

The catalyst is filtered off and the cake is washed with 12.4 milliliters of butanol. The filtrate is acidified to pH 1.7 with 1.4 milliliters of hydrochloric acid. It is then seeded and aged for 44 hours. The crystals are filtered off and washed with 2 x 5.0 milliliters of butanol and dried in vacuo overnight without heat. The washes are combined with the mother liquor. The combined washes and mother liquor assay 12,000–15,000 gammas per milliliter by spectrophotometric assay.

Example 2

To one liter of reduced tetracycline hydrochloride mother liquor obtained as described in Example 1 is added 200 milliliters of water and the pH of the stirred mixture adjusted to 3.0 using 3.5% (w./v.) sodium hydroxide. Calcium hydroxide powder is added until the pH is 4.3. The solution is cooled at 4–8° C. and aged with agitation for at least 2 hours. At this time, the precipitated calcium salt of tetracycline is filtered off and washed with isopropanol and dried.

Example 3

To 3 liters of tetracycline hydrochloride mother liquor prepared as in Example 1 is added 600 milliliters of water and the stirred solution adjusted to 3.0 with 46.0 milliliters of 3.5% (w./v.) sodium hydroxide. Calcium hydroxide powder is added until the pH is 4.5. The solution is then cooled at 8° C. After aging with agitation for 2 hours, the calcium salt is filtered off and washed with 200 milliliters of isopropanol and dried.

*Example 4*

To 22.2 grams of calcium tetracycline (10.0 grams dry weight) prepared as described in the preceding example, is added 12.6 milliliters of 2-ethoxyethanol and 29.5 milliliters of butanol. The pH is adjusted to 2.0 with hydrochloric acid and aged with agitation for 42 hours. The crystals are filtered off and washed with 10.0 milliliters of chloroform, 10.0 milliliters of isopropanol and dried in vacuo overnight at 40° C. The crystals are then slurried with 10.0 milliliters of 2-ethoxyethanol, 22.0 milliliters of butanol and 0.8 milliliter of water. Complete solution is obtained by adding 5.2 milliliters of triethylamine. 9.0 milliliters of hydrochloric acid are added to bring the pH to 2.0. The mixture is aged with agitation for 42 hours. The crystals are filtered and washed with 5.0 milliliters of chloroform and 50 milliliters of isopropanol and dried in vacuo at 40° C. overnight. The product assays 996 gammas per milligram and has an $E_{1 cm}^{1\%}$ of 0.59 at 460 millimicrons

*Example 5*

110 liters of reduced tetracycline mother liquor solution prepared as described in Example 1 is diluted with the addition of 22 liters of water. A to 3 to 5% sodium hydroxide solution is added thereto while being stirred to make the pH 2.5 to 3.3. $Ca(OH)_2$ powder is then gradually added thereto to make the pH 4.0 to 4.5, whereupon tetracycline crystallizes and precipitates as a calcium salt. These crystals are filtered and collected, washed with 6 liters of butanol and dried. 1.1 to 1.3 kilograms of pure crystals of tetracycline calcium salt are obtained. These crystals are suspended in a mixed solution of 2.3 liters of each of butanol and 2-ethoxyethanol. Triethylamine is gradually added thereto while being well stirred and the pH is thereby made about 8 to 9, and the crystals completely dissolve. The solution is once filtered and is made clear. 180 cc. of water are added thereto. 35% hydrochloric acid water is dropped into the solution while being well stirred to adjust the pH to between 1.8 to 2.2. The solution is stirred for 12 to 45 hours, and crystals of tetracycline hydrochloride are deposited and precipitated. These crystals are filtered and collected and are washed with 1000 to 1500 cc. of isopropanol. 800 to 900 grams of tetracycline hydrochloride are obtained.

I claim:

In the process of recovering tetracycline from reduced chlortetracycline solution mother liquors wherein the tetracycline is prepared by catalytically reductively dechlorinating chlortetracycline with hydrogen in the presence of a noble metal catalyst and in the presence of a solvent selected from the group consisting of lower alkanols and lower alkoxy lower alkanols, and mixtures thereof, the improvement which comprises diluting the reduced solution mother liquors with water, adjusting the pH of said solution to between about 2.5–3.3 by the addition of dilute aqueous alkali, and adding calcium hydroxide thereto so as to raise the pH of said solution to between about 4.0–4.5 whereupon a calcium salt of tetracycline is precipitated.

References Cited in the file of this patent

UNITED STATES PATENTS

| | | |
|---|---|---|
| 2,655,535 | Pidacks | Oct. 13, 1953 |
| 2,658,077 | Harms | Nov. 3, 1953 |
| 2,671,806 | Winterbottom | Mar. 9, 1954 |
| 2,699,054 | Conover | Jan. 11, 1955 |
| 2,763,682 | Winterbottom | Sept. 18, 1956 |
| 2,820,824 | Weidenheimer | Jan. 21, 1958 |

FOREIGN PATENTS

| | | |
|---|---|---|
| 167,750 | Australia | May 6, 1954 |
| 525,518 | Belgium | Jan. 30, 1954 |
| 497,340 | Canada | Nov. 3, 1953 |
| 504,172 | Canada | July 6, 1954 |
| 521,467 | Canada | Feb. 7, 1956 |